(12) United States Patent
Ryder

(10) Patent No.: US 11,384,868 B1
(45) Date of Patent: Jul. 12, 2022

(54) PIPE SLEEVE SYSTEM AND METHOD OF USE

(71) Applicant: Joseph Michael Ryder, Aurora, CO (US)

(72) Inventor: Joseph Michael Ryder, Aurora, CO (US)

( * ) Notice: Subject to any disclaimer, the term of this patent is extended or adjusted under 35 U.S.C. 154(b) by 0 days.

(21) Appl. No.: 16/414,437

(22) Filed: May 16, 2019

Related U.S. Application Data

(60) Provisional application No. 62/672,428, filed on May 16, 2018.

(51) Int. Cl.
| | | |
|---|---|---|
| *F16L 3/12* | (2006.01) | |
| *A47B 91/16* | (2006.01) | |
| *F16L 5/10* | (2006.01) | |
| *F16L 21/00* | (2006.01) | |
| *F16L 41/12* | (2006.01) | |
| *G09F 17/00* | (2006.01) | |

(52) U.S. Cl.
CPC ............ *F16L 3/1222* (2013.01); *A47B 91/16* (2013.01); *F16L 5/10* (2013.01); *F16L 21/002* (2013.01); *F16L 41/12* (2013.01); *G09F 17/00* (2013.01)

(58) Field of Classification Search
CPC ....... F16L 3/1222; F16L 41/12; F16L 21/002; F16L 5/10; F16L 3/12; F16L 3/1218; F16L 3/127; G09F 17/00
USPC ..................... 248/188.2, 188.3, 188.5, 188.9
See application file for complete search history.

(56) References Cited

U.S. PATENT DOCUMENTS

| | | | | |
|---|---|---|---|---|
| 5,599,258 A * | 2/1997 | Stone | ..................... | A47C 12/02 297/440.1 |
| 6,892,991 B1 * | 5/2005 | Soh | ........................ | A47B 91/02 16/32 |
| 6,968,583 B1 * | 11/2005 | Rich | ..................... | A47C 19/024 248/188.2 |
| 2004/0173715 A1 * | 9/2004 | Frank | ....................... | B25J 15/00 248/188.9 |
| 2006/0169854 A1 * | 8/2006 | Chen | .................... | G03B 21/145 248/188.2 |
| 2016/0102693 A1 * | 4/2016 | Wang | .................... | F16M 11/28 248/161 |

\* cited by examiner

*Primary Examiner* — James M Hewitt, II
(74) *Attorney, Agent, or Firm* — Richard Eldredge; Eldredge Law Firm

(57) ABSTRACT

A pipe sleeve includes an elongated cylindrical body extending from a base to a top; an anchor rigidly attached to a first position of the elongated cylindrical body, the anchor having an attachment device to secure to a structure; and extendable legs secured to the elongated cylindrical body, the legs each having a foot; each of the extendable legs can be extended a distance to keep a top surface of the elongated cylindrical body level.

5 Claims, 5 Drawing Sheets

PIPE SLEEVE SYSTEM AND METHOD OF USE

BACKGROUND

1. Field of the Invention

The present invention relates generally to pipe sleeves, and more specifically, to a pipe sleeve having a plurality of legs to extend to hold the top of the sleeve in a level position.

2. Description of Related Art

Pipe sleeves are well known in the art and are effective means to aid in positioning pipe to erect a structure. For example, FIG. 1 depicts a conventional pipe sleeve system 101 having a conventional sleeve 103 positioned on an uneven surface 105. During use, the user will secure the pipe sleeve in place, thereby having a means to support a pipe.

One of the problems commonly associated with system 101 is the securing of the pipe sleeve on an uneven surface. For example, the user may use various materials to prop the sleeve to try to attempt a level top. This process can be cumbersome and difficult.

In addition, many pipe sleeves have a top 107, which is not clear, and therefore it becomes difficult for the user to properly align the sleeve with a marked area.

Accordingly, although great strides have been made in the area of pipe sleeves, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
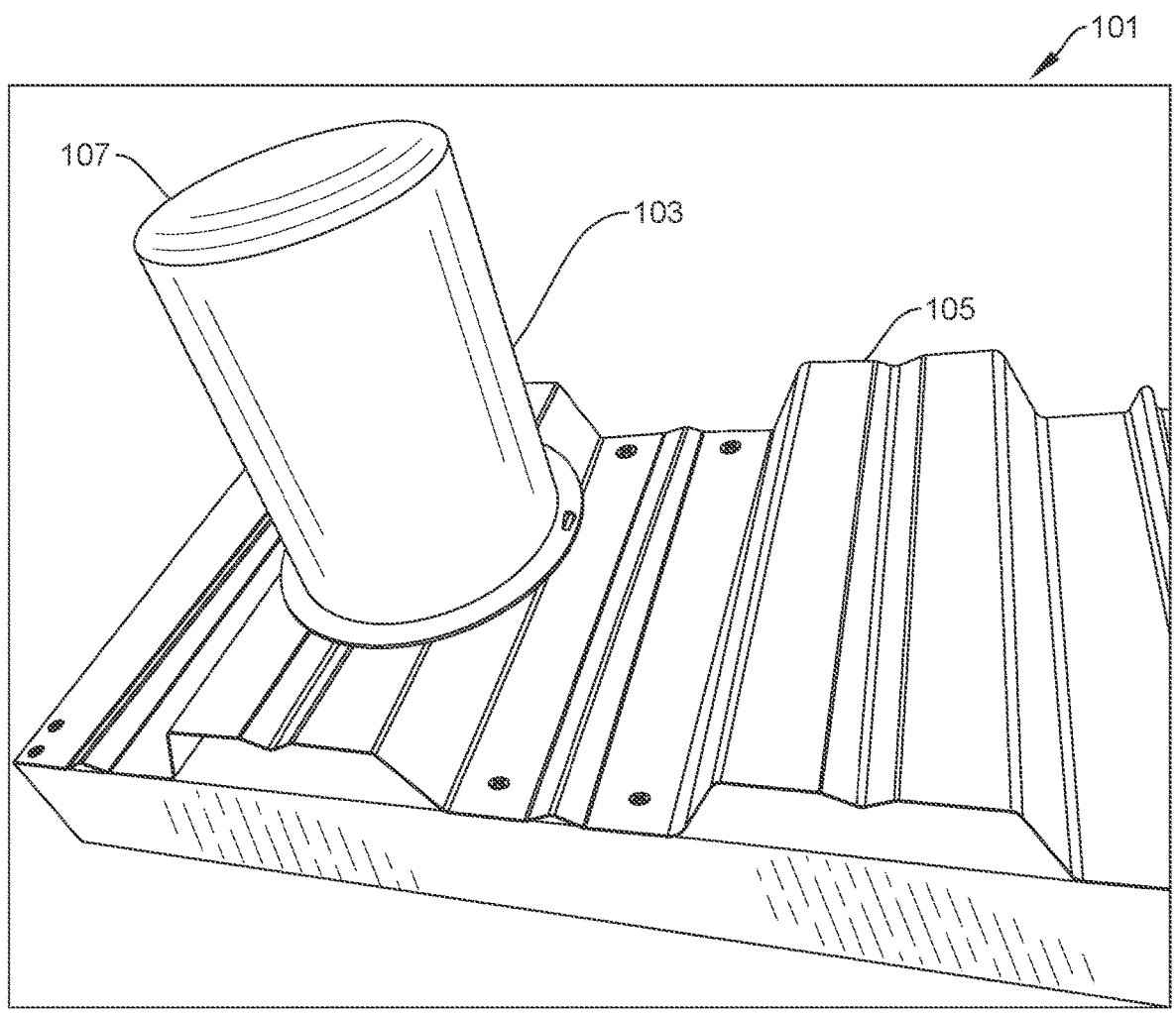
FIG. 1 is a perspective view of a common pipe sleeve system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional pipe sleeve systems. Specifically, the present invention provides a pipe sleeve having a plurality of legs that extend and retract, thereby allowing for easy securing on an uneven surface. In addition, the sleeve of the present invention is manufactured with either a clear top or no top at all, thereby making any markings visible for aligning of the sleeve. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
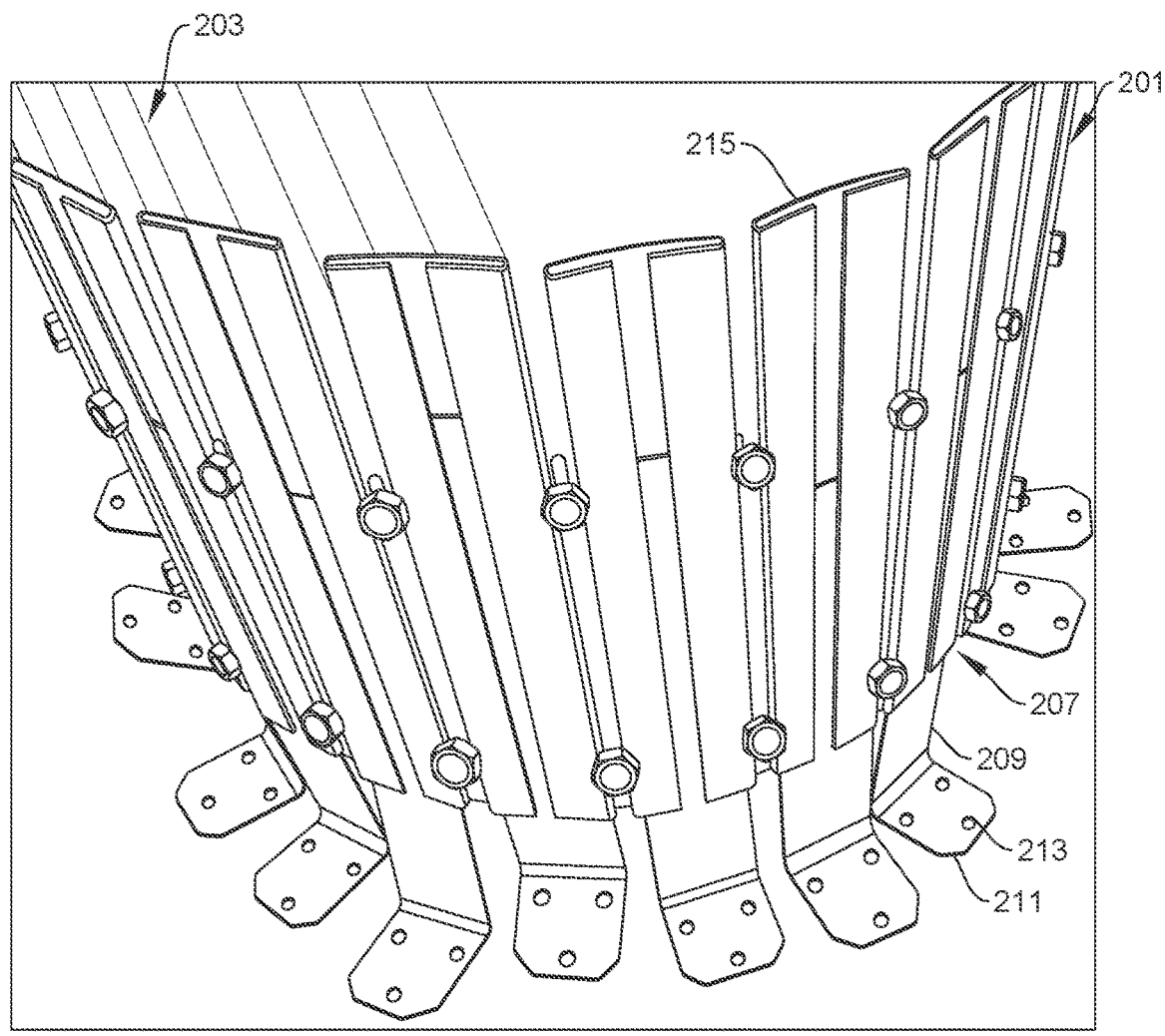
FIG. 2 is a perspective view of a first side of a pipe sleeve in accordance with a preferred embodiment of the present application.
Figure 3:
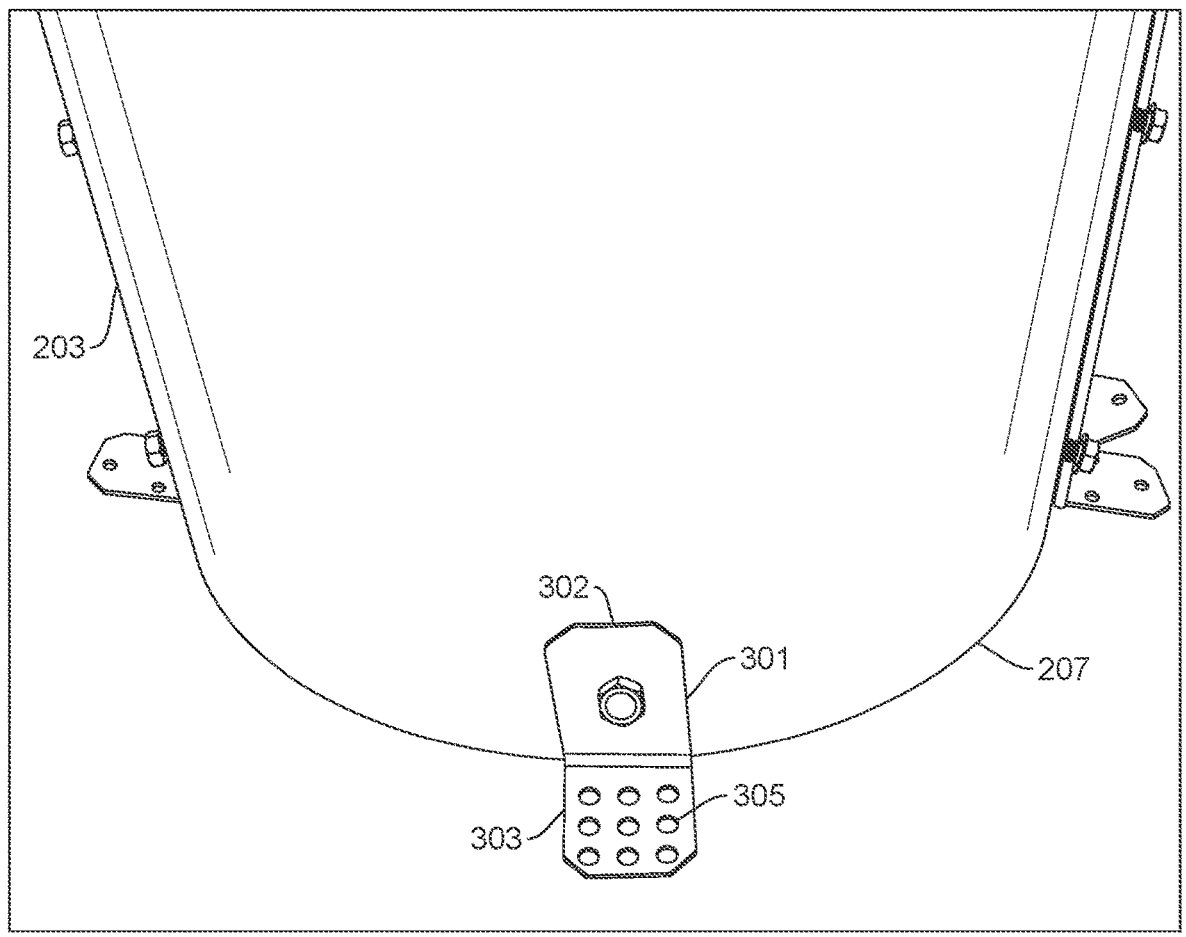
FIG. 3 is a perspective view of a second side of a pipe sleeve in accordance with a preferred embodiment of the present application.

Referring now to the drawings wherein like reference characters identify corresponding or similar elements throughout the several views, FIGS. 2 and 3 depict perspective views of a first side and second side of a pipe sleeve 201 in accordance with a preferred embodiment of the present application. It will be appreciated that pipe sleeve 201 overcomes one or more of the above-listed problems commonly associated with conventional pipe sleeves.

In the contemplated embodiment, sleeve 201 includes an elongated cylindrical body 203 having a top 205 and a base 207. A plurality of legs 209 are attached to a side of the body and configured to extend and retract. As shown, in one embodiment, each of the plurality of legs 209 includes a foot 211, which can have one or more holes 213 to provide areas wherein the user can screw or bolt the feet to a structure. As further shown in FIG. 2, in one embodiment, each of the plurality of legs is attached to body 203 via a channel 215, thereby allowing for the legs to slidingly move up and down.

As shown in FIG. 3, in the preferred embodiment sleeve 201 further includes an anchor 301 which can be used to secure the sleeve in place prior to use. In one embodiment, the anchor 301 is an L-shaped bracket, wherein a first side 302 is permanently attached to body 203, and a second side 303 can have a plurality of holes 305 allowing for the user to anchor the sleeve in place.

It should be appreciated that one of the unique features believed characteristic of the present application is the plurality of extendable legs, being configured to extend. It should be appreciated that this feature allows for the level securing of the sleeve on an uneven surface. This is accomplished by the user extending down each of the legs a necessary distance to support the body, thereby keeping the top surface in a level position.

Figure 4:
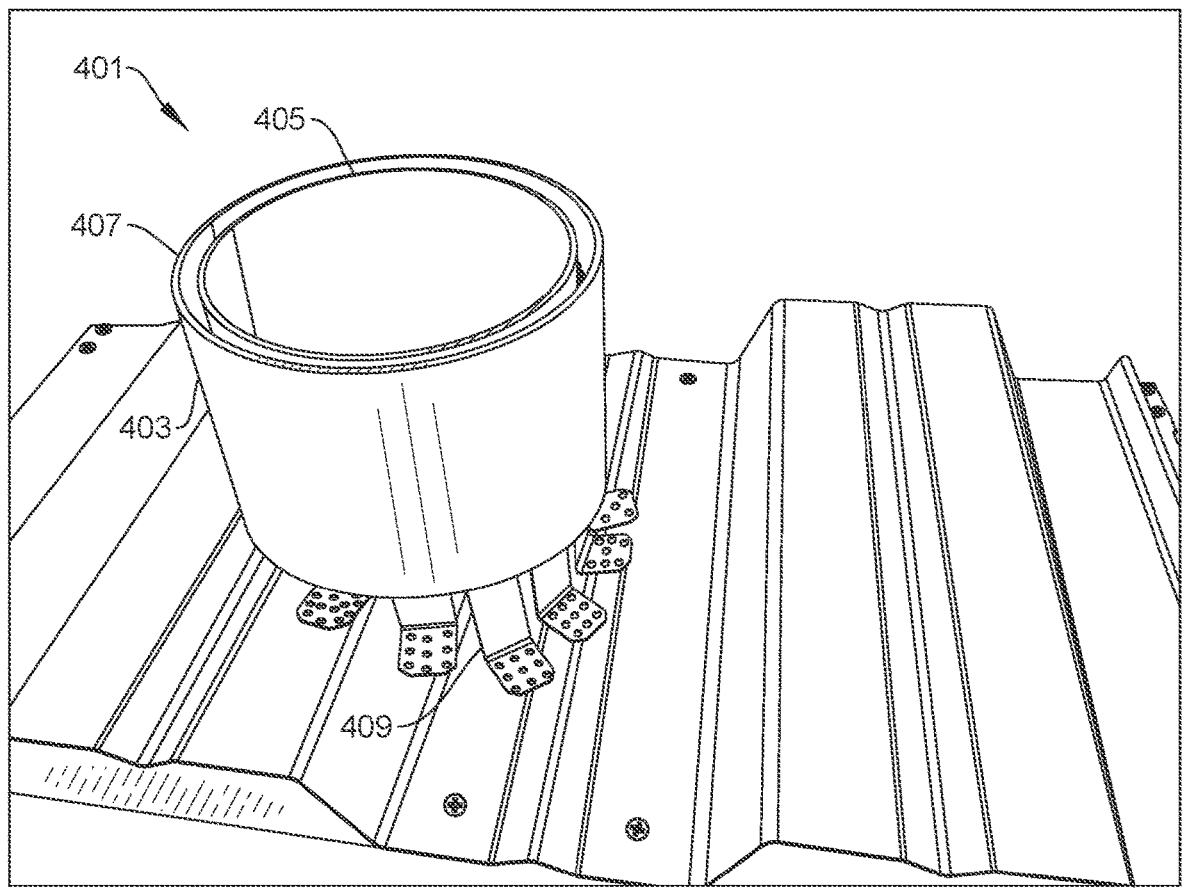
FIG. 4 is a perspective view of an alternative embodiment of a pipe sleeve in use in accordance with the present application.

In FIG. 4, an alternative embodiment of a sleeve 401 is shown. In this embodiment, all of the teachings discussed with sleeve 203 can be included. Sleeve 401 includes a body 403 having an interior body 405 and an exterior body 407, with a plurality of legs 409 extendible secured therebetween.

It should be appreciated that the sleeves of the present application can be composed of various materials, including clear plastics. In addition, in some embodiments, a top can be secured to the body, wherein the top is clear and thereby allows for easy placement of the sleeve.

Figure 5:
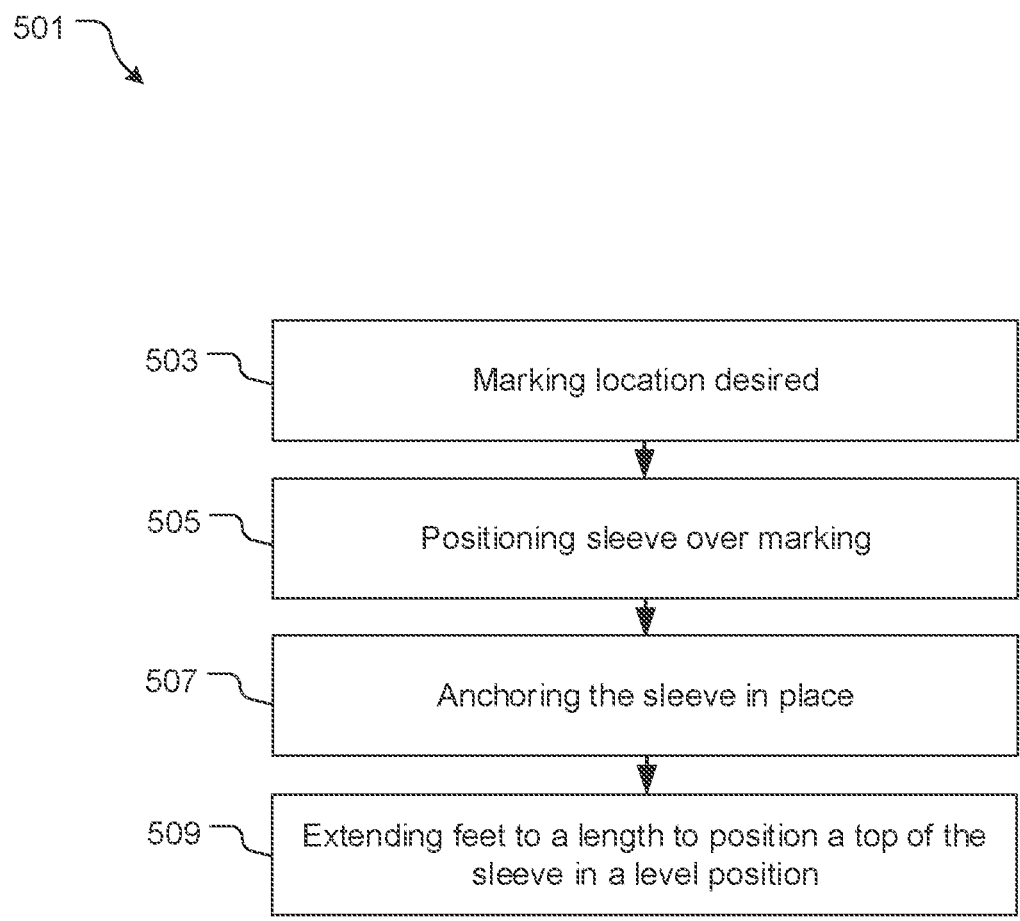
FIG. 5 is a flowchart of the method of use of the present invention.

In FIG. 5, a flowchart 501 depicts a method of use of the system of the present invention. During use, the user marks a location from which a pole is to be erected, as shown with box 503. The user then positions the sleeve as needed relative to the marking, as shown with box 505. The user can then anchor the sleeve in place via the anchor, such as through use of screws and/or bolts, as shown with box 507. The user can then extend the legs as needed to place and keep the top surface level, as shown with box 509. The user can then proceed construction as necessary.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A pipe sleeve, comprising:
   an elongated cylindrical body extending from a base to a top;
   an anchor rigidly attached to a first position of the elongated cylindrical body, the anchor having an attachment device to secure to a structure; and
   a plurality of extendable legs secured to the elongated cylindrical body, the plurality of legs each having a foot;
   wherein each of the plurality of extendable legs can be extended a distance to keep a top surface of the elongated cylindrical body level.

2. The pipe sleeve of claim 1, wherein each of plurality of legs comprises is slidingly engaged with a channel, the channel being rigidly attached to the elongated cylindrical body.

3. The pipe sleeve of claim 1, wherein the elongated cylindrical body further comprises:
   an interior body; and
   an exterior body;
   wherein the plurality of legs are positioned to extend from between the interior body and the exterior body.

4. The pipe sleeve of claim 1, wherein the elongated cylindrical body is composed of a clear plastic.

5. The pipe sleeve of claim 1, wherein the anchor is an L-bracket attached to the elongated cylindrical body on a first side and configured to secure to a structure on a second side.

* * * * *